(12) United States Patent
Alves et al.

(10) Patent No.: US 11,059,208 B2
(45) Date of Patent: Jul. 13, 2021

(54) SPRUE SYSTEM FOR INJECTION-MOLDING PROCESSES

(71) Applicant: Ford Global Technologies, LLC, Dearborn, MI (US)

(72) Inventors: Bruno Alves, Huerth (DE); Baha Ber, Cologne (DE); Christian Heinisch, Cologne (DE); Lieven Werner, Kerpen Brüggen (DE); Pascal Schneider, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 16/424,724

(22) Filed: May 29, 2019

(65) Prior Publication Data
US 2019/0366608 A1 Dec. 5, 2019

(30) Foreign Application Priority Data

May 30, 2018 (DE) ...................... 10 2018 208 638.9

(51) Int. Cl.
*B29C 45/17* (2006.01)
*B29C 45/27* (2006.01)
*B29C 45/32* (2006.01)

(52) U.S. Cl.
CPC ...... *B29C 45/1781* (2013.01); *B29C 45/2725* (2013.01); *B29C 45/322* (2013.01)

(58) Field of Classification Search
CPC .............. B29C 45/322; B29C 45/1781; B29C 45/2725; B29C 2045/2733; B29C 2045/2759; B29C 2045/2761; B29C 2045/2762; B29C 2045/2772; B29C 45/1777

See application file for complete search history.

(56) References Cited

U.S. PATENT DOCUMENTS

| | | | | |
|---|---|---|---|---|
| 2,821,750 | A | * | 2/1958 | Huelskamp ......... B29C 45/2701 425/460 |
| RE30,335 | E | * | 7/1980 | Johansson ............... B29C 45/23 425/548 |
| 4,292,018 | A | * | 9/1981 | Beale .................. B29C 45/2725 425/144 |

(Continued)

FOREIGN PATENT DOCUMENTS

| CN | 202716439 | 2/2013 |
|---|---|---|
| CN | 104786434 | 7/2015 |
| EP | 0344381 | 4/1993 |

*Primary Examiner* — Xiao S Zhao
*Assistant Examiner* — Emmanuel S Luk
(74) *Attorney, Agent, or Firm* — Burris Law, PLLC

(57) ABSTRACT

A sprue system for a nozzle-side injection-molding arrangement of an injection-molding machine for introducing a plasticizable and/or plasticized plastics material into an injection-molding tool along a runner, the center axis of which fixes an injection axis, includes a sprue piece which at least partially forms the runner, a tube portion and a flange portion. A fastener assembly for fastening the sprue system to the injection-molding tool and for aligning the sprue piece along the injection axis is included. The sprue piece and the fastener assembly are formed adjustably in relation to one another and the sprue system has an adjuster for setting a distance (A) between the flange portion and the fastener assembly.

16 Claims, 5 Drawing Sheets

(56) References Cited

U.S. PATENT DOCUMENTS

| | | | | |
|---|---|---|---|---|
| 4,653,995 A | * | 3/1987 | Ward | B29C 45/2701 425/190 |
| 4,732,514 A | * | 3/1988 | Shiina | B23B 51/107 408/86 |
| 4,882,469 A | * | 11/1989 | Trakas | B29C 45/2737 219/421 |
| 5,017,127 A | * | 5/1991 | Majerus | B29C 45/2701 264/328.15 |
| 5,334,006 A | | 8/1994 | Hepler et al. | |
| 5,545,028 A | * | 8/1996 | Hume | B29C 45/30 264/328.15 |
| 5,554,395 A | * | 9/1996 | Hume | B29C 45/27 264/328.15 |
| 5,704,113 A | * | 1/1998 | Mak | B29C 45/2737 219/421 |
| 6,852,264 B2 | | 2/2005 | Ouellette | |
| 8,714,965 B2 | * | 5/2014 | Chen | B29C 45/20 425/570 |
| 2006/0240141 A1 | * | 10/2006 | Pruden | B29C 45/281 425/568 |
| 2007/0110843 A1 | * | 5/2007 | Pruden | B29C 45/322 425/568 |
| 2008/0050466 A1 | * | 2/2008 | Gaillard | B29C 45/322 425/572 |
| 2008/0131547 A1 | | 6/2008 | Mohammed et al. | |
| 2008/0145473 A1 | * | 6/2008 | Eigler | B29C 45/322 425/575 |
| 2009/0194910 A1 | * | 8/2009 | Rosner | B29C 45/2725 264/328.15 |
| 2013/0287888 A1 | * | 10/2013 | Overfield | B29C 45/20 425/567 |
| 2015/0158223 A1 | * | 6/2015 | Fairy | B29C 45/2737 425/549 |
| 2016/0214296 A1 | * | 7/2016 | Kim | B29C 45/27 |

* cited by examiner

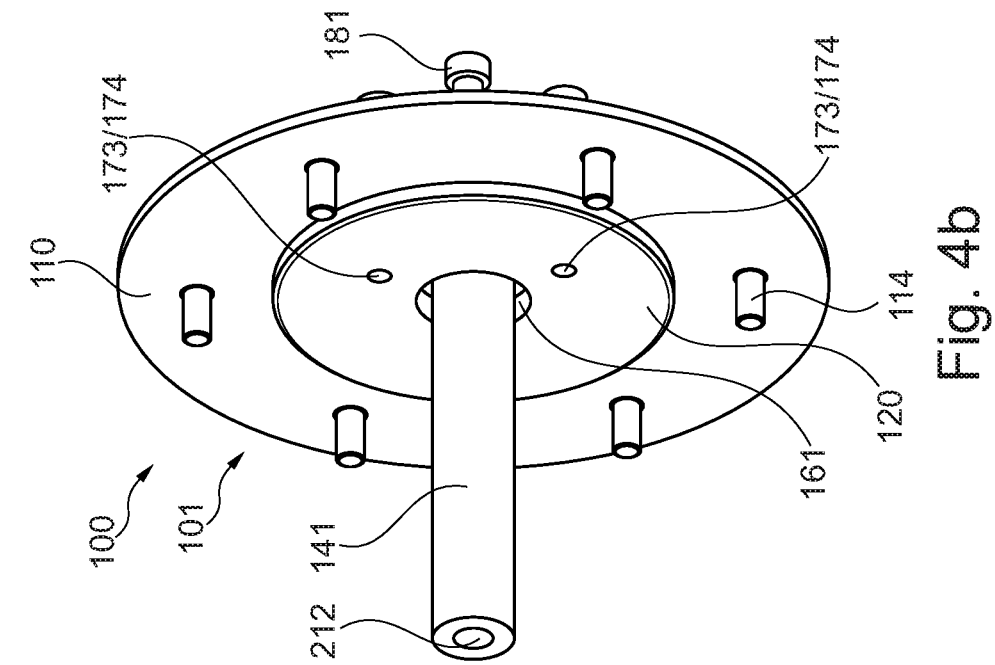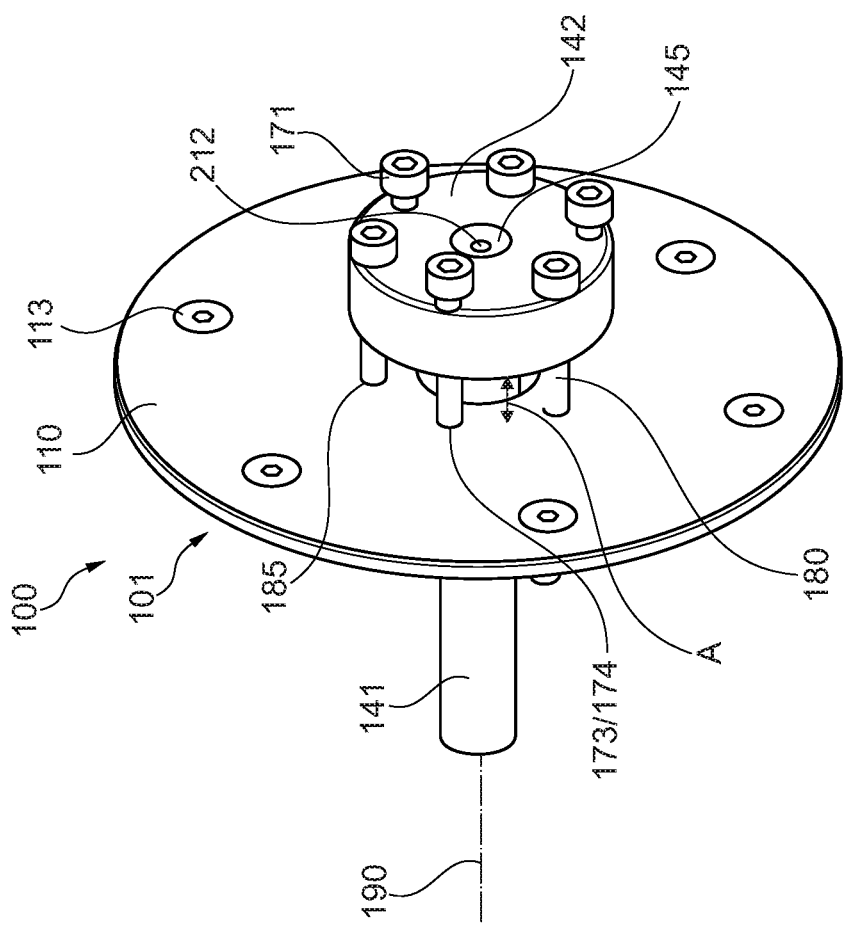

SPRUE SYSTEM FOR INJECTION-MOLDING PROCESSES

CROSS-REFERENCE TO RELATED APPLICATIONS

This application claims priority to and the benefit of DE 102018208638.9 filed on May 30, 2018. The disclosures of the above applications are incorporated herein by reference.

FIELD

The present disclosure relates to a sprue system for an injection-molding machine.

BACKGROUND

The statements in this section merely provide background information related to the present disclosure and may not constitute prior art.

In an injection-molding process, plastic or some other material is plasticized or liquefied by means of an injection-molding machine and injected under pressure into an injection-molding tool. The injection molded plastic or other material is subsequently cured by cooling and, after opening of the injection-molding tool, also simply referred to herein as the "tool", can be removed as a finished part (also known as and referred to herein as a "workpiece"). The hollow space in the tool, known as the cavity, determines the form of the workpiece and possibly the surface structure of the workpiece. For the manufacture of each new workpiece, i.e., a workpiece with a different form or shape, an individually produced tool with a cavity formed for the workpiece to be produced is required. Also, the costs for the tool make up a considerable part of the investments for a workpiece and in the case of a small batch, for example for prototypes, the costs for each manufactured workpiece are very high.

In order to put together a new tool, various standard components are required and individual components are typically available from a large selection of purchasable parts. One standard component that is required is the "sprue bush", which is referred to herein as the "sprue piece." A sprue piece usually consists of a tube portion and a flange portion. A nozzle of an injection device, for example a screw injection device, is attached to a "docking device" of the flange portion, which is typically designed as a hemispherical depression. Also in prototype construction, in which the individual forms of workpieces are always different, a large number of sizes of different sprue pieces are available on the market since a new sprue piece is typically obtained for a specific tool in order to keep within the desired tolerance class of the fit (e.g., H7-g6; clearance fit: parts movable without notable play). Accordingly, the sprue piece is a relatively large cost component, measured in terms of the overall costs, of a tool for prototypes.

In addition to the above, the correct length of the sprue piece is important since only very small tolerances (H7-g6) between the sprue piece and the tool are admissible. Furthermore, it is not possible to push or insert the sprue piece further into the tool if there is undesired play between the end of the tube portion and the cavity, and installation of the sprue piece in the nozzle-side injection-molding arrangement typically involves repeated reworking to ensure sufficiently exact execution of the assembly. Accordingly, proper installation of a new sprue piece in the tool can take up to three hours by a skilled craftsperson.

Known from U.S. Pat. No. 5,096,410 A is a sprue piece which has a flange portion, a tube portion, and a centering ring connecting the flange portion to the injection-molding device by way of two fastening screws. The tube portion is surrounded by an outer sleeve and an intermediate space is provided between the tube portion and the sleeve for controlling the temperature of the sprue piece with water. Both the sleeve and the centering ring form contact walls, between which the flange portion of the sprue piece is held in a form-fitting manner.

In US 2008/0131547 A1, tube-like sprue pieces are moved cyclically and horizontally in an injection-molding machine for the simultaneous production of a number of workpieces. To be able to bring the sprue tubes into fluid-tight operative connection with the injection devices in every cycle, guiding frames are provided. Also, lateral delimiting walls of the guide frame for guiding the sprue pieces to be moved by means of adjusting screws are included.

Also known from CN 104786434 A is an exchangeable sprue piece with a rib-shaped arresting device for centering the sprue piece. The arresting device is brought into form-fitting engagement with a complementary groove in a mold plate and annular seals between the sprue piece and the mold plate seal the device with respect to a platen.

CN 202716439 U concerns a sprue device for an injection mold with a flange element and a tube element, the two together forming a conically extending runner. The flange element and the tube element are made as separate components and the flange element is connected to a fixing device by way of fastening screws. This device allows the flange element to be exchanged and at the same time the tube element to continue to be used.

U.S. Pat. No. 6,852,264 B2 relates to a sprue system with a runner that forms a fluid distribution system which supplies liquefied plastics material at the same time to four sprue tubes and associated injection nozzles for the hollow space in the mold.

EP 0 344 381 A2 concerns, inter alia, two sprue pieces which are arranged coaxially in relation to one another and are kept at a distance from one another by a spiral spring lying coaxially therebetween. During the injecting operation, the nozzle of the injection device presses against the first sprue piece at a hemispherical depression and the spiral spring is compressed such that the first sprue piece is pressed against the second sprue piece and a continuous runner is formed.

U.S. Pat. No. 5,334,006 A describes a sprue piece with a tube element, a flange element and a thickening over a portion of the tube element having an external thread. Also, three internal threaded bores are arranged in the form of a ring for mounting of the flange element and a fixing plate. For fixing the available depth of penetration of the tube element into the plates of the injection-molding machine, a cylindrical spacing sleeve is screwed onto the external thread and an end face of the spacing sleeve acts as a stop face with respect to a plate of the injection-molding machine. Depending on the length of the sleeve used with respect to the cylinder axis, various lengths of penetration of the tube element can be fixed.

SUMMARY

It should be understood that the features and measures recited individually in the following description can be combined with one another in any technically meaningful way and demonstrate further teachings, examples, aspects and the like of the present disclosure. The description additionally characterizes and specifies the present disclosure in particular in conjunction with the figures. In one form of the present disclosure, a sprue system is provide for a nozzle-side injection-molding arrangement of an injection-molding machine for introducing a plasticizable and/or plasticized plastics material into an injection-molding tool along a runner and for which a center axis defines an injection axis. The sprue system has a sprue piece, which at least partially forms the runner and comprises a tube portion and a flange portion, and a fastener assembly for fastening the sprue system to the injection-molding tool and for aligning the sprue piece along the injection axis.

In some aspects of the present disclosure, the sprue piece and the fastener assembly are formed adjustably in relation to one another and the sprue system has at least one adjuster for setting a distance between the flange portion and the fastening means. By setting or varying this distance, the depth of penetration of the tube portion into the injection-molding tool, also referred to simply as the tool, can be set. Consequently, a form-fitting and fluid-tight stop with respect to a portion of the runner continuing downstream can be formed within the tool along the injection axis, for example a sprue gate. As a result, the sprue piece or the sprue system can be used for various tools, and consequently for various nozzle-side injection-molding arrangements, and can at the same time meet desired tolerances (H7-g6).

The tube portion and the flange portion are generally arranged coaxially in relation to the injection axis, and one behind the other so that they form a continuous inner tube, i.e., the runner. In some aspects of the present disclosure, the inner tube has a constant cross section. In other aspects, the inner tube has a varying cross section. The fastener assembly has portions, elements or devices for fixing and/or fastening the sprue piece to the tool. Furthermore, a centering device for centering the sprue piece, and consequently the runner, coaxially in relation to the injection axis is provided on or by the fastener assembly. The fastener assembly may have a fixing device and a centering device formed as one piece or a fixing device and a centering device coupled together by a releasable connection.

In some aspects of the present disclosure, the fastener assembly includes a tube portion lead-through (aperture) with delimiting walls that surround the tube portion of the sprue piece. The tube portion lead-through may for example have a circular cross section, the center point lying on the injection axis. In such aspects the fastener assembly is arranged between the flange portion and the tool, for example on a platen.

A displacement of the sprue piece along the injection axis is provided and a distance between the flange portion of the sprue piece and the fastener assembly is set and/or can be set by at least one threaded connection between the adjuster and the sprue piece and/or the adjuster and the fastening means.

A threaded connection between an adjuster and the fastener assembly may take the form of a fastening screw screwed into an internal threaded bore in the fastener assembly. In the alternative, or in addition to, a threaded connection between the adjusting and the flange portion may take the form of an adjusting screw screwed into a flange threaded bore. Advantageously, an opportunity for setting the distance between the flange portion of the sprue piece and the fastener assembly is possible after final assembly for readjustment.

In some aspects of the present disclosure, the flange portion has one or a plurality of flange through-openings for at least one fastening screw to be disposed within and the fastener assembly has one or more (i.e., a plurality) corresponding internal threaded bores. The at least one fastening screw passes through the flange through-opening and engages in an internal threaded bore such the distance between the sprue piece and the fastener assembly is set.

The further the fastening screw is screwed into the internal threaded bore of the fastener assembly, the smaller the distance between the flange portion of the sprue piece and the fastener assembly. The screw head of the fastening screw may form a stop for the flange portion and as a result, the sprue piece is on the one hand releasably fixed on the fastener assembly and on the other hand arrested (inhibited) from twisting about the injection axis.

In some aspects of the present disclosure, the flange portion may have one or a plurality of flange threaded bores for engagement with at least one adjusting screw, the at least one adjusting screw, while engaging in a respective flange threaded bore, being supported with a stop face on the fastener assembly such that the distance between the flange portion and the fastener assembly is set. Accordingly, the further the adjusting screw is screwed into the flange threaded bore, the greater the distance between the flange portion and the fastener assembly. The end remote from the screw head of the adjusting screw may in this case form a stop face for forming a flat stop contact with the fastener assembly. In some aspects, the fastening screw and the adjusting screw respectively form a stop for the sprue piece and inhibit unintentional displacement along the injection axis. By coordinated turning of the fastening screw and/or adjusting screw, the distance between the flange portion and the fastener assembly can be readjusted after assembly of the sprue system.

In some aspects of the present disclosure, the plurality of flange through-openings and/or the plurality of flange threaded bores are arranged around the injection axis in the form of a ring or in the form a ring of holes with the center point of the ring of holes lying on the injection axis. In such aspects, a plurality of threaded connections can be arranged along the flange portion such that the stability of the sprue system is improved.

In some aspects of the present disclosure, the number of flange through-openings is equal to the number of flange threaded bores. In such aspects, one or each flange through-opening may be positioned between two adjacent flange threaded bores and/or one or each flange threaded bore may be positioned between two adjacent flange through-openings. The openings or bores may therefore be arranged alternately along a ring of holes, which evenly distributes the forces that act on the flange portion or the sprue piece.

In another form of the present disclosure, a sprue system includes an injection-molding tool, a sprue piece comprising a tube portion and a flange portion, and a fastener assembly attached to and for fastening the sprue piece to the injection-molding tool. The spruce piece defines at least a portion of a runner of the injection-molding tool and the flange portion comprises a flange through-opening and a flange threaded bore. The fastener assembly comprises a tube portion lead-through with delimiting walls that surround the tube portion of the sprue piece and an internal threaded bore corresponding to the flange through-opening. A fastening screw is disposed in the flange through-opening, an adjusting screw is engaged with the flange threaded bore, and the sprue piece is attached to the fastener assembly via the fastening screw disposed in the flange through-opening of the flange portion and engaged with the internal threaded bore of the fastener assembly. Also, the sprue piece and the fastener assembly are adjustable in relation to one another such that a distance (A) between the flange portion of the sprue piece and the fastener assembly is set.

In some aspects of the present disclosure, the flange portion comprises a plurality flange through-openings and a plurality of flange threaded bores, the fastener assembly comprises a plurality of internal threaded bores corresponding to the plurality of flange through-openings and a plurality of fastening screws disposed in the plurality of flange through openings, and the adjusting screw comprises a plurality of adjusting screws engaged with the plurality of flange threaded bores. In such aspects the sprue piece and the fastener assembly are adjustable in relation to one another by the plurality of adjusting screws engaged with the plurality of flange threaded bores such that the distance (A) between the flange portion of the sprue piece and the fastener assembly is set. Also, each of the plurality of flange through-openings may be positioned between two adjacent flange threaded bores and each of the plurality of flange threaded bores may be positioned between two adjacent flange through-openings.

In some aspects of the present disclosure, the sprue system includes a plurality of fixing device through-bores in the fastener assembly and a plurality of fixing screws disposed within the plurality of fixing device through-bores and engaged with a plurality of blind-hole bores in the injection-molding tool such that the fastener assembly and the sprue piece are attached to the injection-molding tool.

In still another form of the present disclosure, an assembly method for a sprue system for a nozzle-side injection-molding arrangement of an injection-molding machine for introducing a plasticizable and/or plasticized plastics material from an injection device into a tool along a runner is provided. A center axis of the runner defines an injection axis. In some aspects of the present disclosure, the method includes assembling a sprue system and the sprue system includes a sprue piece, a fastener assembly, a plurality of adjusting screws, a plurality of fastening screws, and a plurality of fixing screws. The sprue piece includes a tube portion and a flange portion comprising a plurality of through-openings and a plurality of flange threaded bores. The fastener assembly comprises a tube portion lead-through, a plurality of internal threaded bores corresponding to the plurality of flange through-openings, and a plurality of fixing device through-bores. The method includes disposing the plurality of adjusting screws in the plurality of flange threaded bores for setting a distance (A) between the flange portion of the sprue piece and the fastener assembly, and disposing the tube portion of the sprue into the tube portion lead-through of the fastener assembly. The method also includes fastening the sprue piece to the fastener assembly by disposing the plurality of fastening screws in the plurality of through openings and engaging the plurality of fastening screws with the plurality of internal threaded bores such that the distance (A) is set between the flange portion and the fastener assembly. The method may also include fastening the fastener assembly to the injection-molding tool by disposing the plurality of fixing screws into the plurality of the plurality of fixing device through-bores and engaging the plurality of fixing screws with a plurality of blind-hole bores in the injection-molding tool.

In some aspects of the present disclosure, at least one of the plurality of adjusting screws is screwed into at least one of the flange threaded bores until a stop face for a stop contact for supporting the adjusting screw is formed. In the alternative, or in addition to, at least one of the plurality of fastening screws is screwed into one of the plurality of internal threaded bores such that a stop contact forms between the fastening assembly and a stop face.

The assembly method allows the sprue piece to be removed from the tool or the nozzle-side injection-molding arrangement without having to remove the entire sprue system, whereby about 3-5 hours of assembly work can be saved.

It is particularly advantageous in that for a fixed distance between the flange portion and the fastening means, at least one adjusting screw or at least one other adjusting means is screwed in and/or pushed in while engaging with one or more flange threaded bores, until a stop face for a stop contact for supporting the adjusting screw or some other adjusting means is formed or can be formed. Also, at least one fastening screw is screwed and/or pushed into an internal threaded bore in the fastening means until a stop contact forms between the fastening means and a stop face and/or between the flange portion and a stop face.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 5:
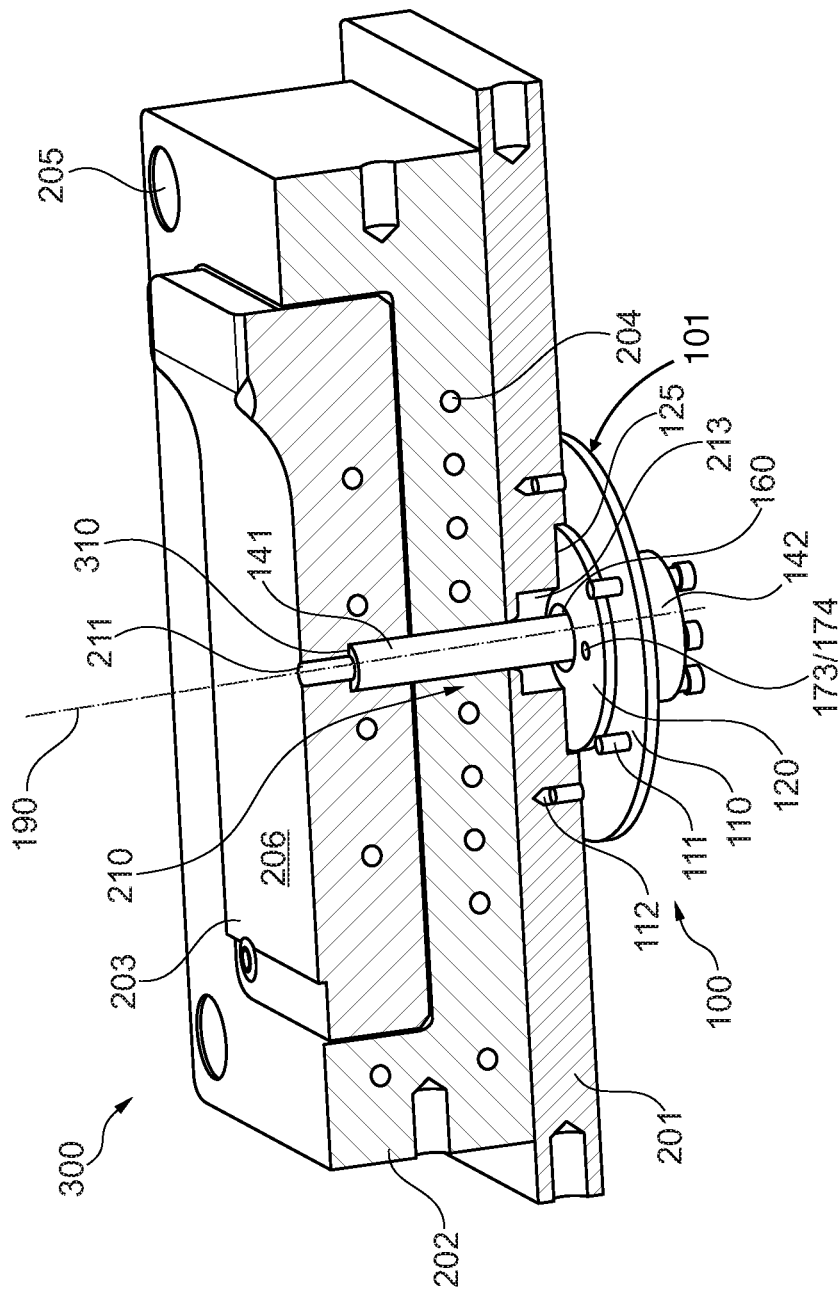

FIG. 4*a* shows a first perspective representation of a sprue system according to the teachings of the present disclosure;

FIG. 4*b* shows a further perspective representation the sprue system in FIG. 4*a*; and FIG. 5 shows a perspective sectional representation of a nozzle-side injection-molding arrangement of according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
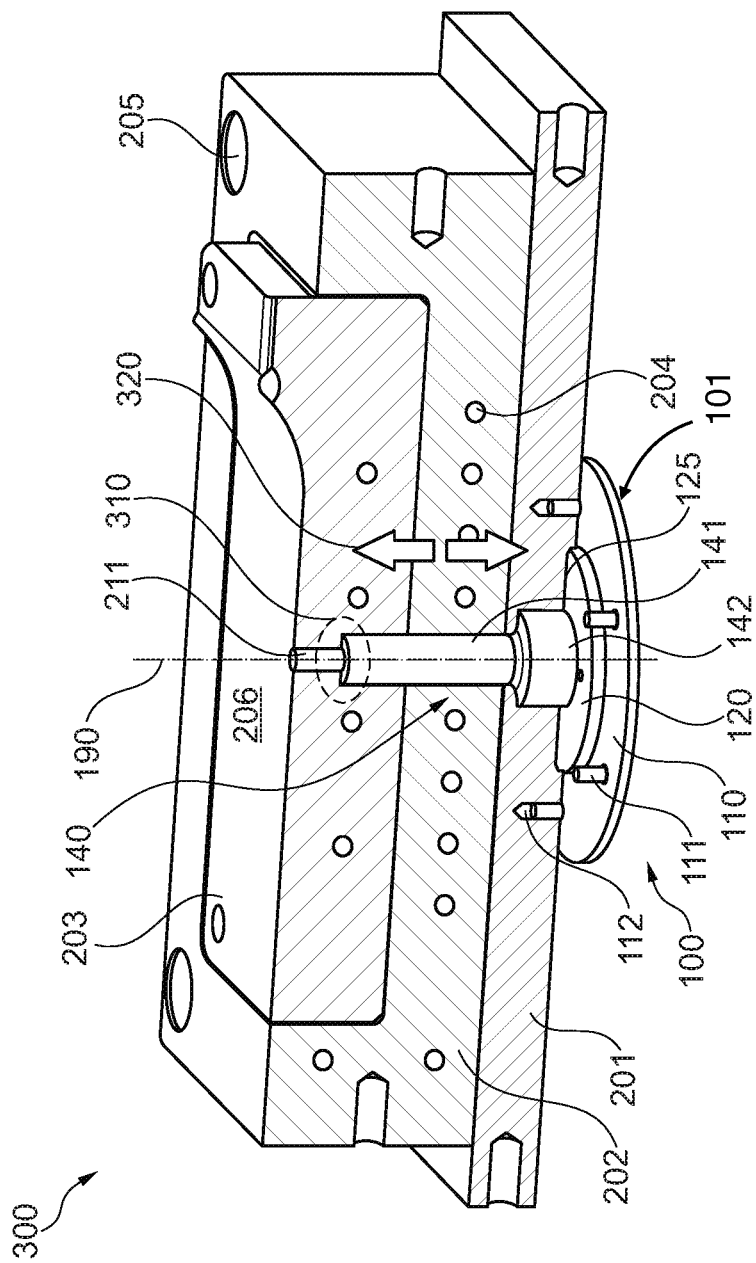
FIG. 1 shows a perspective sectional representation of a nozzle-side injection-molding arrangement from the prior art.

FIG. 1 shows a nozzle-side injection-molding arrangement 300 with the nozzle-side components of a tool and with a sprue system 100 according to the prior art. A tool consists of a number of plates placed one on top of the other in the manner of layers. As shown in FIG. 1 the sprue system 100 is mounted on a platen 201. In the inward direction, that is to say toward the finished workpiece, a mold plate 202 is provided, lying flat against the platen 201, and is adjoined in turn to a mold insert 203 lying flat against it. The mold plate 202 and the mold insert 203 have apertures for a system of lines, for example a cooling system 204, for controlling the temperature of the nozzle-side injection-molding arrangement 300. During opening and closing, one half of a tool is guided along guiding elements, for which guiding element depressions 205 are provided in the mold plate 202. The cavity 206 within the mold insert 203 forms the hollow space in which the plasticized plastic cures. The plasticized plastic is injected by an injection device (not represented), for example a nozzle, through a runner 212 (shown in FIG. 2) along an injection axis 190. The runner 212 runs essentially within a sprue piece 140 and a sprue gate 211 is between the sprue piece 140 and the cavity 206. The sprue piece 140 is typically a drilled-out cast part of non-corrosive steel, which has been reworked by machining. The runner 212 within the sprue piece 140 may have a conical or cylindrical shape. The sprue piece 140 also has a tube portion 141 and a flange portion 142, the flange portion 142 being intended to be understood as being coaxially arranged as a tube flange of the tube portion 141. The sprue piece 140 is held on the tool by way of a fastening means (e.g., fastener assembly 101).

In this case, the lateral surfaces of the tube portion 141 and of the flange portion 142 are enclosed in a form-fitting manner by the platen 201, the mold plate 202 and the mold insert 203. On the end portion of the tube portion 141 that is facing the cavity 206, the end wall of the tube portion 141 also forms a stop 310 with the mold insert 203. In particular at this stop 310, it is desired to keep within the prescribed tolerance classes of the fit. Consequently, the correct length of the sprue piece 140 must be chosen, since only very small tolerances (H7-g6) between the sprue piece 140 and the tool are admissible. In addition, there is no freedom of movement 320 to push the sprue piece 140 further into the tool if there is undesired play between the end of the tube portion 141 and the mold insert 203 or some other plate of the tool. The sprue piece 140 is also formed as essentially rotationally symmetrical about the injection axis 190, but arresting inhibitors (not represented) may be provided against twisting of the sprue piece 140 about the axis of rotation.

The fastener assembly 101, which keeps the sprue piece 140 in the tool, has a fixing device 110 and a centering device 120, both being formed as circular metal plates and being placed one on top of the other in the manner of layers. Provided both in the fixing device 110 and in the centering device 120 is an aperture or lead-through 160 (cf. FIG. 2), through which the injection channel 212 runs. The fixing device 110 and the centering device 120 are arranged coaxially in relation to one another, in relation to the sprue piece 140 and in relation to the injection axis 190. For fastening to the platen 201, the fixing device 110 has fixing device through-bores 115 (cf. FIG. 3), through which fixing screws 111 or other fixing means can be led. For assembly, the fixing screws 111 can be brought into engagement with blind-hole bores 112 in the platen 201. For receiving the centering device 120 in a form-fitting manner, the platen 201 has a centering depression 125, for example a pocket, that complements the centering device 120.

Figure 2:
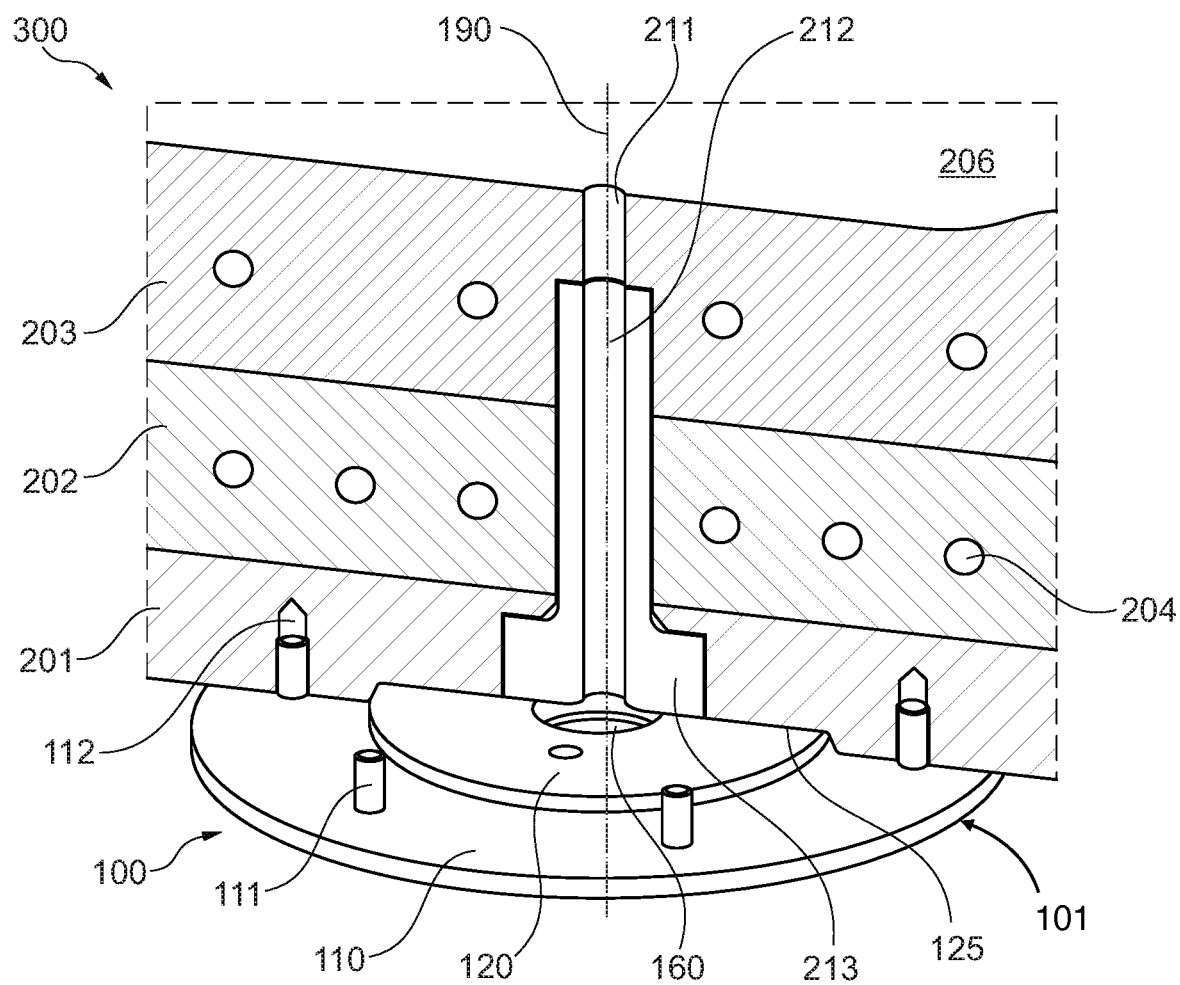
FIG. 2 shows a further perspective sectional representation of a nozzle-side injection-molding arrangement from the prior art with the sprue piece omitted.

FIG. 2 shows a detail of the nozzle-side injection-molding arrangement 300 with the sprue piece 140 omitted. In the region of the flange portion 142 (see FIG. 1), the aperture in the platen 201 is widened to form a flange clearance 213. The omission also makes it possible to show the lead-through 160, through which during the injecting operation the nozzle of an injection device can be led and placed against the flange portion 142 (see FIG. 1).

Figure 3:
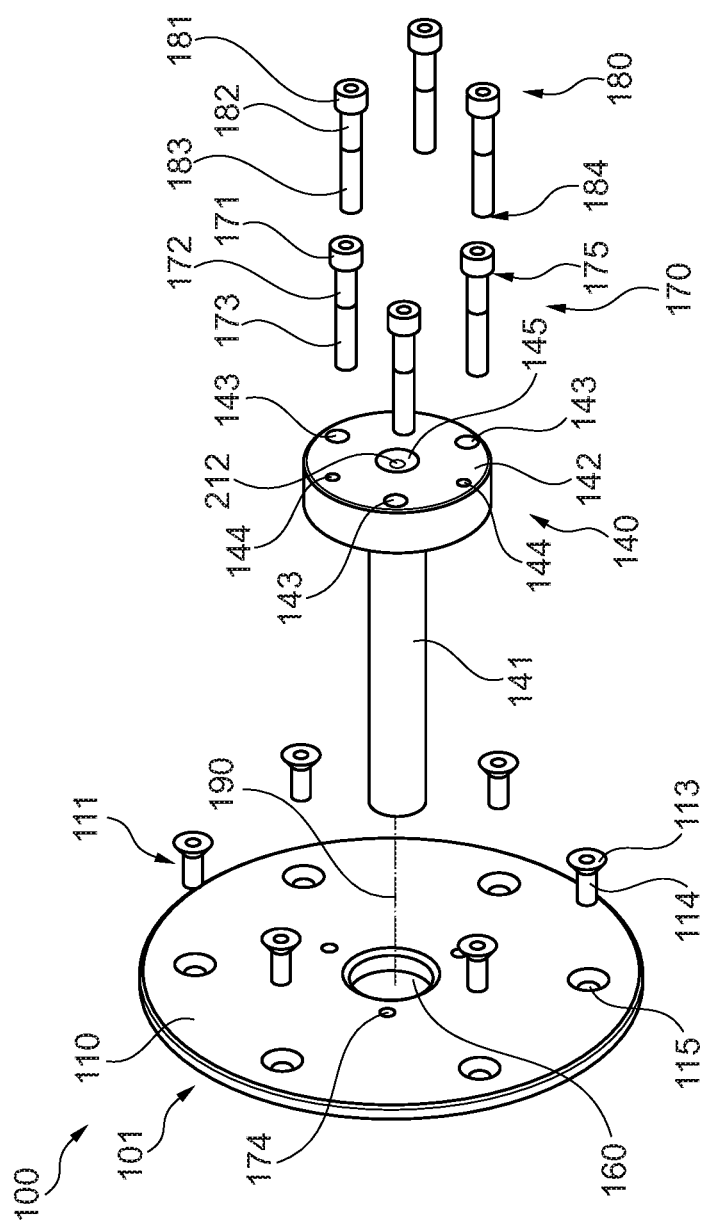
FIG. 3 shows a perspective exploded view of a sprue system according to the teachings of the present disclosure.

FIG. 3 shows a sprue system 100 in an exploded drawing according to one form of the present disclosure. In this case, the represented fixing device 110 of the fastener assembly 101 is fastened by way of fixing screws 111 or some other fixing means, it being possible for these to be led through fixing device through-bores 115 and, by actuation of the screw head 113, for the screw thread 114 of the fixing screws 111 to be brought into engagement with the blind-hole bores 112 of the platen 201 (shown in FIG. 1). The tube portion 141 may be pushed through the lead-through 160 along the injection axis 190 and in the direction of flow of the plastic to be injected. The flange portion 142 has in the center a hemispherical depression 145 for the form-fitting "docking" of the nozzle of an injection device, and consequently the entry into the runner 212. Provided around the center point of the flange portion 142 or around the injection axis 190 as a ring of holes are three flange through-openings 143 and three flange threaded bores 144, arranged alternating with one another.

Provided for each flange threaded bore 144 is an adjusting screw 180, which has an adjusting screw head 181, an adjusting screw shank 182 and an adjusting screw thread 183. Provided at the end of an adjusting screw 180 remote from the adjusting screw head 181 is a wall, which can form a stop face 184 with respect to the fastener assembly 101. The adjusting screw thread 183 is intended for a threaded connection with the flange threaded bore 144. Also provided for each flange through-opening 143 is a fastening screw 170, which likewise has a fastening screw head 171, a fastening screw shank 172 and a fastening screw thread 173. The fastening screw thread 173 is intended for a threaded connection with the internal threaded bore 174 in the fastener assembly 101. Likewise provided at the fastening screw head 171 of a fastening screw 170 is a wall, which can form a stop face 175 with respect to the flange portion 142.

FIG. 4a shows an assembled sprue system 100, the adjusting means, here the fastening screws 170 and the adjusting screws 180, allowing a distance A to be set between the flange portion 142 and the fastener assembly 101. In the assembly, the flange portion 142 has a side or wall that is facing the fastener assembly 101. Extending away from this side of the flange portion 142 is an adjusting screw shank 182 or an adjusting screw thread 183 of an adjusting screw 180 that passes through the flange portion 142. The distance A in this case corresponds to the length of this extending-away portion of the adjusting screw 180. The stop face 184 (see FIG. 3) of the adjusting screws 180 forms a stop contact 185 with a wall of the fastener assembly 101. In other words, the position of the stop face 184 is consequently fixed by the relative position or the relative movement between the adjusting screws 180 and the flange element 142 and/or by the depth of penetration of the adjusting screws 180 into the flange threaded bores 144 of the flange element 142. For this, adjusting screws 180 of the same length should expediently have the same relative position or the same depth of penetration. Further pushing of the sprue piece 140 into the fastener assembly 101, and consequently into the tool (shown in FIG. 5), is consequently no longer possible. Further screwing of the adjusting screws 180 into the flange threaded bore 144, if possible, increases the distance A. The sprue piece 140 is readjusted.

FIG. 4b shows the sprue system 100 from the perspective that is hidden from the viewer after installation in the nozzle-side injection-molding arrangement 300 (shown in FIG. 5). The maximum screwing-in depth of the fastening screw thread 173 of the fastening screws 170 into the internal threaded bore 174 of the fastener assembly 101 is dictated by the geometrical dimensions of the fixing device 110 and the centering device 120, for example the thickness of the metal disks. Furthermore, there is a clearance between the delimiting walls 161 of the lead-through 160 and the outer wall of the tube portion 141, which however can be reduced by appropriate choice of the geometrical dimensions.

FIG. 5 shows the installation of the sprue system 100 into the nozzle-side injection-molding arrangement 300. The variability of the distance A (shown in FIG. 4a) always allows a stop 310 to be formed between the tube portion 141 and the mold insert 203 for the forming of a continuous runner 212 (cf. FIG. 2). It is also possible to dispense with the still represented flange clearance 213 in the platen 201, thereby dispensing with the need for a machining step. Machining steps are also dispensed with because the threaded connection between the fastening screw thread 173 and the internal threaded bores 174 of the fastener assembly 101 makes it possible to dispense with the need for an additional twist prevention or arrestment against twisting of the sprue piece 140 about the injection axis 190.

Unless otherwise expressly indicated herein, all numerical values indicating mechanical/thermal properties, compositional percentages, dimensions and/or tolerances, or other characteristics are to be understood as modified by the word "generally", "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A sprue system for a nozzle-side injection-molding arrangement of an injection-molding machine for introducing a plasticizable and/or plasticized plastics material into an injection-molding tool of the injection-molding machine along a runner, a center axis of which is an injection axis, the sprue system comprising:
   a sprue piece comprising a tube portion, a flange portion, wherein the sprue piece at least partially defines the runner; and
   a fastener assembly configured for fastening the sprue system to the injection-molding tool and configured for aligning the sprue piece along the injection axis, wherein the flange portion has a flange through-opening configured for a fastening screw to be disposed within and the fastener assembly has a corresponding internal threaded bore, and the flange portion has a flange threaded bore configured for engagement with an adjusting screw, and the adjusting screw, while engaging the flange threaded bore, is supported with a stop face on the fastener assembly such that a distance (A) between the flange portion of the sprue piece and the fastener assembly can be set.

2. The sprue system according to claim 1, wherein the fastener assembly has a tube portion lead-through defining delimiting walls, the delimiting walls of the tube portion lead-through surrounding the tube portion of the sprue piece.

3. The sprue system according to claim 1, wherein the distance (A) between the flange portion and the fastener assembly is greater than zero.

4. The sprue system according to claim 1, wherein the flange through opening is a plurality of flange through-openings and the fastening screw is a plurality of fastening screws configured to be disposed within the plurality of flange through-openings, the internal threaded bore is a corresponding plurality of internal threaded bores, and the plurality of fastening screws set the distance (A) between the sprue piece and the fastener assembly by passing through the plurality of flange through-openings and engaging the corresponding plurality of internal threaded bores.

5. The sprue system according to claim 4, wherein the plurality of flange through-openings are arranged around the injection axis in the form of a ring.

6. The sprue system according to claim 1, wherein the flange threaded bore is a plurality of flange threaded bores and the adjusting screw is a plurality of adjusting screws configured for engagement with the plurality of flange threaded bores, and the plurality of adjusting screws, while engaging the plurality of flange threaded bores are supported with a stop face on the fastener assembly such that the distance (A) between the flange portion and the fastener assembly is set.

7. The sprue system according to claim 6, wherein the plurality of flange threaded bores are arranged around the injection axis in the form of a ring.

8. The sprue system according to claim 1, wherein the flange through-opening is a plurality of flange through-openings, the flange threaded bore is a plurality of flange threaded bores, and the number of the plurality of flange through-openings is equal to the number of the plurality of flange threaded bores.

9. The sprue system according to claim 8, wherein each of the plurality of flange through-openings is positioned between two adjacent flange threaded bores and each of the plurality of flange threaded bores is positioned between two adjacent flange through-openings.

10. A sprue system comprising:
    an injection-molding tool;
    a sprue piece comprising a tube portion and a flange portion, wherein the spruce piece defines at least a portion of a runner of the injection-molding tool and the flange portion comprises a flange through-opening and a flange threaded bore;
    a fastener assembly attached to the sprue piece and configured for fastening the sprue piece to the injection-molding tool, wherein the fastener assembly comprises a tube portion lead-through, a fastening screw, and an adjusting screw, the tube portion lead-through defining delimiting walls that surround the tube portion of the sprue piece and an internal threaded bore corresponding to the flange through-opening, the fastening screw being disposed in the flange through-opening, and the adjusting screw being engaged with the flange threaded bore and supported with a stop face on the fastener assembly;
    wherein the sprue piece is attached to the fastener assembly via the fastening screw disposed in the flange through-opening of the flange portion and engaged with the internal threaded bore of the fastener assembly; and
    the sprue piece and the fastener assembly are adjustable in relation to one another such that a distance (A) between the flange portion of the sprue piece and the fastener assembly is set.

11. The sprue system according to claim 10, wherein:
    the flange portion comprises a plurality flange through-openings and a plurality of flange threaded bores;

the fastener assembly comprises a plurality of internal threaded bores corresponding to the plurality of flange through-openings and a plurality of fastening screws disposed in the plurality of flange through-openings;

the adjusting screw comprises a plurality of adjusting screws engaged with the plurality of flange threaded bores; and the sprue piece and the fastener assembly are adjustable in relation to one another by the plurality of adjusting screws engaged with the plurality of flange threaded bores such that the distance (A) between the flange portion of the sprue piece and the fastener assembly is set.

12. The sprue system according to claim 11 further comprising a plurality of fixing device through-bores in the fastener assembly and a plurality of fixing screws disposed within the plurality of fixing device through-bores and engaged with a plurality of blind-hole bores in the injection-molding tool such that the fastener assembly and the sprue piece are attached to the injection-molding tool.

13. The sprue system according to claim 11, wherein each of the plurality of flange through-openings is positioned between two adjacent flange threaded bores and each of the plurality of flange threaded bores is positioned between two adjacent flange through-openings.

14. An assembly method for attaching and adjusting a sprue piece to an injection-side nozzle arrangement of an injection-molding tool, the assembly method comprising:

assembling a sprue system comprising:

the sprue piece, wherein the sprue piece comprises a tube portion and a flange portion with a plurality of through-openings and a plurality of flange threaded bores;

a fastener assembly comprising a tube portion lead-through, a plurality of internal threaded bores corresponding to the plurality of flange through-openings, and a plurality of fixing device through-bores; and a plurality of adjusting screws, a plurality of fastening screws, and a plurality of fixing screws;

disposing the plurality of adjusting screws in the plurality of flange threaded bores for setting a distance (A) between the flange portion of the sprue piece and the fastener assembly, wherein each of the plurality of adjusting screws have a stop face for supporting each of the plurality of adjusting screws on the fastener assembly;

disposing the tube portion of the sprue piece into the tube portion lead-through of the fastener assembly;

fastening the sprue piece to the fastener assembly by disposing the plurality of fastening screws in the plurality of through-openings and engaging the plurality of fastening screws with the plurality of internal threaded bores, wherein the distance (A) is set between the flange portion and the fastener assembly by rotating the plurality of adjusting screws in the plurality of flange threaded bores; and fastening the fastener assembly to the injection-molding tool by disposing the plurality of fixing screws into the plurality of the plurality of fixing device through-bores and engaging the plurality of fixing screws with a plurality of blind-hole bores in the injection-molding tool.

15. The assembly method according to claim 14, wherein at least one of the plurality of adjusting screws is screwed in until the stop face of the at least one of the plurality of adjusting screws defines a stop contact that supports the at least one of the plurality adjusting screws against the fastener assembly.

16. The assembly method according to claim 14, wherein at least one of the plurality of fastening screws is screwed into one of the plurality of internal threaded bores such that a stop contact forms between the fastening assembly and a stop face.

* * * * *